H. BLANK, Jr.
ICE CUTTING MACHINE.
APPLICATION FILED OCT. 23, 1913.
1,155,400.
Patented Oct. 5, 1915.
4 SHEETS—SHEET 3.
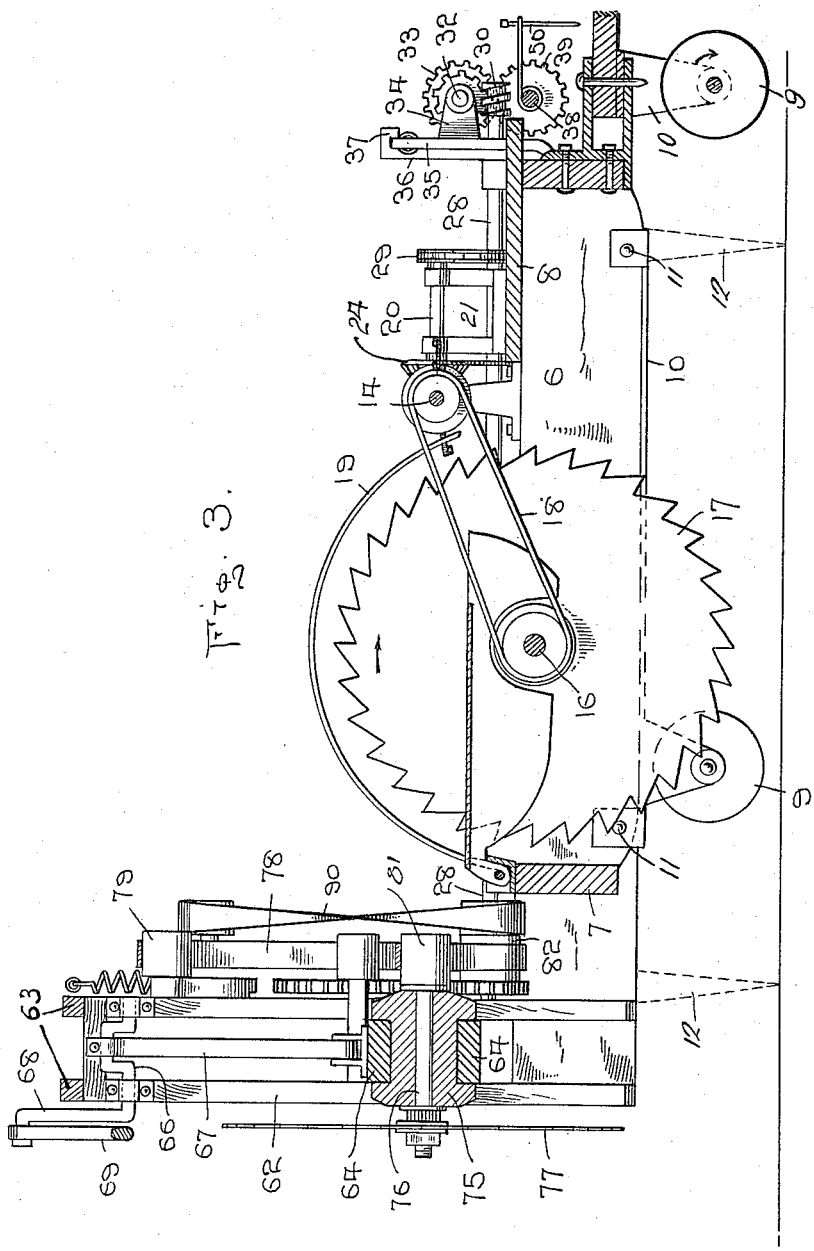

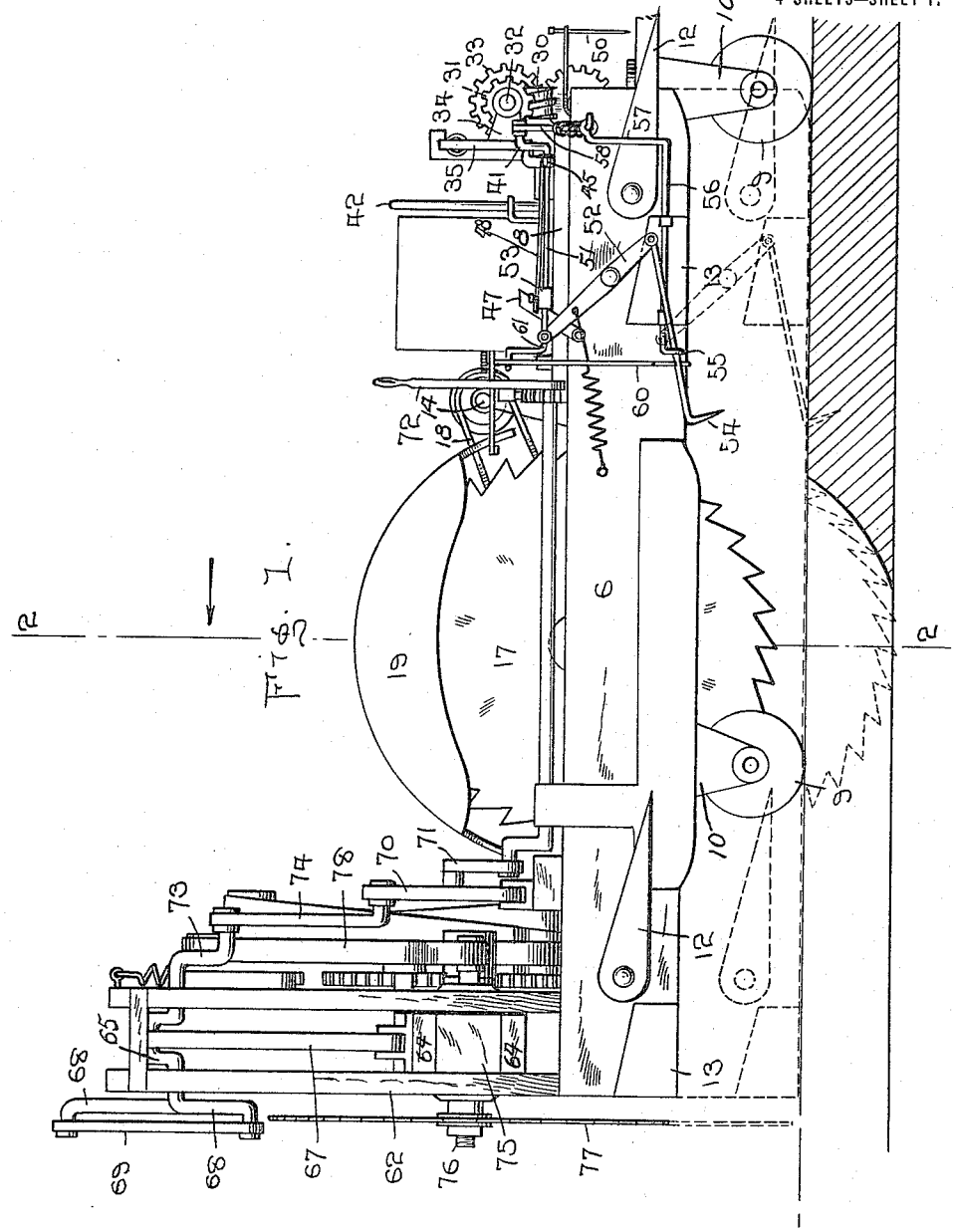

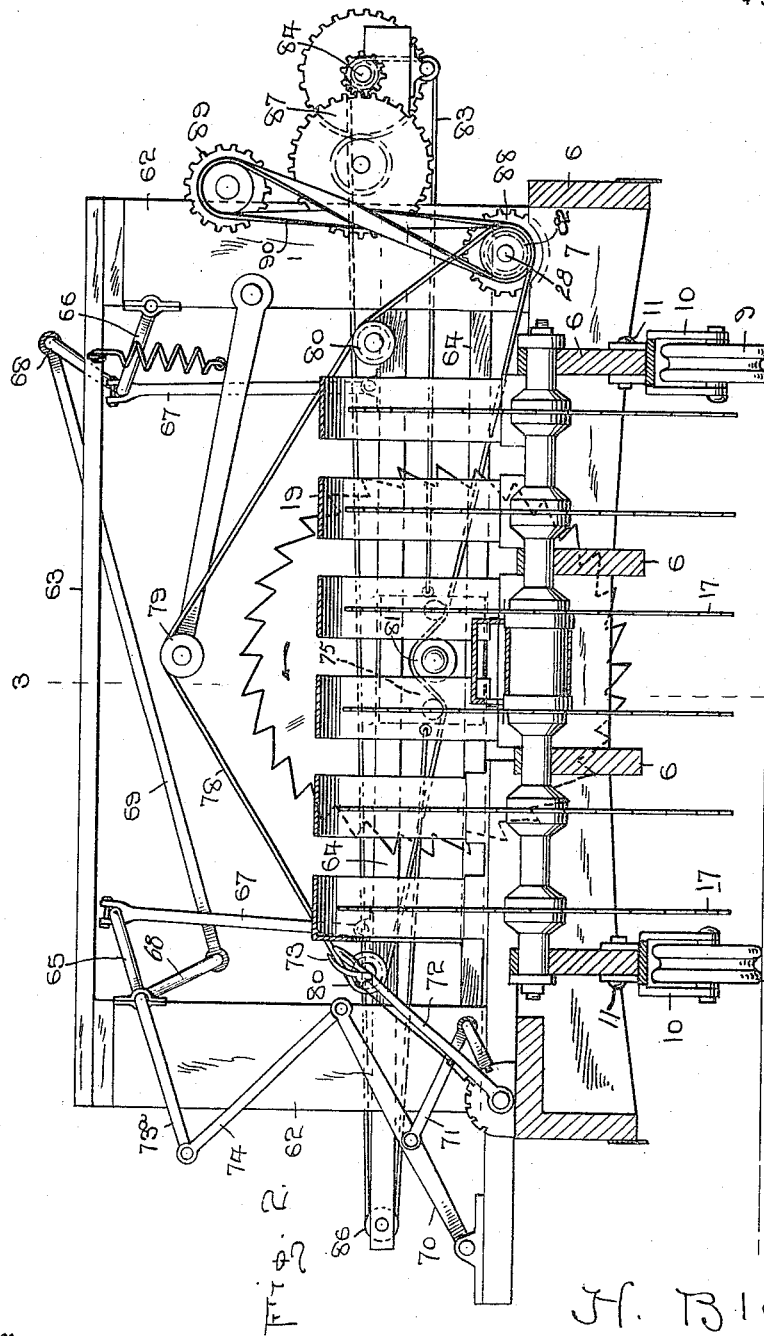

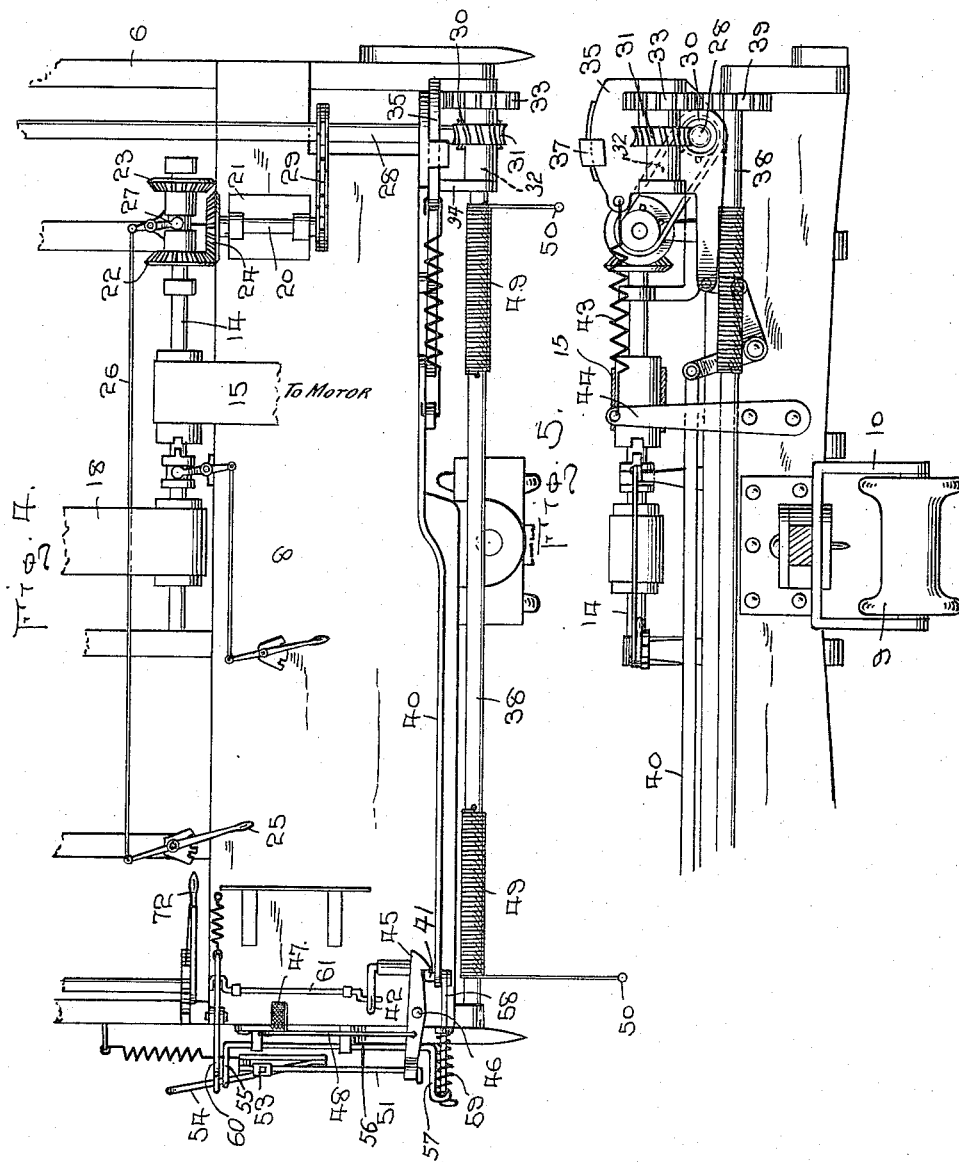

UNITED STATES PATENT OFFICE.

HERMAN BLANK, JR., OF MADISON, NEBRASKA.

ICE-CUTTING MACHINE.

1,155,400.  Specification of Letters Patent.  Patented Oct. 5, 1915.

Application filed October 23, 1913. Serial No. 796,902.

*To all whom it may concern:*

Be it known that I, HERMAN BLANK, Jr., a citizen of the United States, residing at Madison, in the county of Madison and State of Nebraska, have invented certain new and useful Improvements in Ice-Cutting Machines; and I do hereby declare the following to be a full, clear, and exact description of the invention, such as will enable others skilled in the art to which it appertains to make and use the same.

The object of this invention is to provide an ice cutting machine for cutting ice into cakes or blocks, the said invention residing primarily in various manually operable, driving, connecting, resilient and automatic means, the coacting relationship existing therebetween to be hereinafter set forth and the whole being possessed of those advantages and that desirability which may be readily inferred therefrom.

In the accompanying drawings wherein is shown an approved embodiment of the invention, Figure 1, represents a side elevation of the machine complete upon its transporting wheels, as shown in full lines, the machine being also shown by the dotted lines, as the same would appear when lowered in operative position upon a field of ice with the transporting wheels removed. Fig. 2, represents a sectional view on the line 2—2 of Fig. 1, showing the machine in condition for transportation. Fig. 3, represents a sectional view on the line 3—3 of Fig. 2, but showing the machine as elevated above the ice upon its supporting legs, shown in dotted lines, preparatory to the removal of its transporting wheels. Fig. 4, represents a top plan view of the front part of the machine. Fig. 5, represents a front elevation of a part of the machine.

Referring to the drawing in detail, 6 indicates the longitudinal beams and 7, the transverse beams of the supporting structure for the parts of the machine. The platform 8, is secured over the supporting structure at the forward end of the latter, and said frame is supported above the ground or ice by wheels 9, removably secured beneath the beams of the supporting structure by suitable supporting members 10, and removable pins 11 when the machine is being transported from one point of use to another. A suitable number of legs 12, are pivoted to the longitudinal beam 6 at the respective sides of the supporting structure, and are adapted to abut against the stops 13, when the legs 12 are forced downwardly into engagement with the surface of the ice to sustain the supporting structure above the ice while the wheels are being removed therefrom or attached thereto as the case may be.

It is understood that at the beginning of the sawing operation, the wheels 9 and their supporting members 10 are removed from beneath the supporting structure, by the removal of the pins 11 while the machine is being supported by the legs 12. The machine is then moved slightly backward and lowered, due to the pivotal action of the legs 12, until the saws 17 are brought into contact with the surface of the ice. The legs 12 are then raised to their horizontal position at the sides of the machine, and the saws are started to rotate, whereupon the saws will cut their way through the ice, thus further lowering the machine until the bottom surface of the beams 6 rest upon the top of the ice, thereby providing runners for the smooth gliding of the machine upon the ice when drawn forwardly in a manner to be hereinafter described.

The platform 8, is adapted to support a suitable motor (not shown), from which is driven the shaft 14, by suitable driving means such as a belt 15. Behind the shaft 14, is mounted a second shaft 16, which is journaled in the longitudinal beams 6, of the supporting structure and carries a plurality of circular saws 17, pairs of these saws being preferably separated from adjacent pairs by one of the longitudinal beams 6. A belt 18, connects the shafts 14 and 16, and drives the latter together with the saws 17. Shields 19, are pivoted rearwardly of the saws 17, and are adapted to be positioned thereover, as shown.

A counter-shaft 20, is rotatably mounted above the platform 8, in suitable brackets 21, and is driven from the shaft 14, by either of the gears 22 or 23, meshing with the gear 24. For shifting the gears 22 and 23 for freeing the gear 24, or for rotating it in the desired direction, a suitable hand lever 25, is provided and connected therewith by the link 26, and lever 27. A shaft 28, is adapted to be driven from the counter-shaft 20, by a chain 29, working over suitable sprocket wheels carried by said shafts. The shaft 28, extends longitudinally of the supporting structure and is provided at its forward end with a worm 30, which meshes with a worm wheel 31, fixed on a shaft 32, which latter also carries a gear wheel 33. The bearings 34, for the shaft 32, are carried by a plate 35, which is pivoted upon the shaft 28, adjacent the worm 30, and is guided in its movement over the rear plate 36, by a guide finger 37.

A winding shaft 38, is rotatably supported at the forward end of the supporting structure and carries at one end a gear wheel 39, which is adapted to mesh with the gear wheel 33, when the plate 35 is moved to the position shown in Fig. 5. The plate 35, is adapted to be shifted so as to operatively connect the gears 33 and 39, by a bar 40, which is connected at its opposite extremity to the crank end 41, of a hand lever 42. The gears 33 and 39, are normally held out of mesh by a suitable spring 43, disposed between the plate 35 and arm 44, and for holding said gears in mesh against the tension of the spring, a spring actuated latch 45, is provided and pivoted at 46, to the platform 8, and adapted to spring behind the crank 41, as the latter is moved by the hand lever 42, to connect said gears. A foot lever or pedal 47, is pivoted to the platform 8, and connected with the latch 45, by a latch bar 48, for manually rocking the latch and releasing the crank 41.

Cables 49, are secured at one end to the winding shaft 38, and are provided at their opposite end with stakes 50, which are adapted to be driven into the ice or earth so that the cable may be wound upon the shaft 38, when the latter is rotated for drawing the machine over the ice. A rod 51, is slidably mounted through the outer extremity of the latch 45, and is pivotally connected at one end to a pivoted lever 52, and carries an adjustable abutment 53, adapted for engagement with the extremity of the latch 45, for actuating the latter to release the crank 41. The lever 52, is pivoted to the outer longitudinal beam 6, and is connected at its lower end with an ice engaging hook 54. The shank of the hook 54, is slidably received within the looped crank arm 55, of a shaft 56, which latter also carries on its opposite extremity a second looped crank arm 57. The loop in the last mentioned crank arm 57, slidably receives a rod 58, pivoted at one end to the crank arm 41, and working through said looped crank arm against the tension of a spring 59. When the hand lever 42, is shifted to connect the gears 33 and 39, the spring actuated latch 45, springs behind the crank 41, and holds said gears in mesh and in this way, the machine is drawn forward by the cables 49 winding upon the winding shaft 38. Movement of the crank 41, causes the ice engaging hook 54, to be depressed and embedded in the ice by the rod 58, cranks 55 and 57, and shaft 56. As the machine is drawn forward the hook 54 obviously remains stationary, turning the lever 52, sliding the rod 51 forwardly through the outer extremity of the latch 45, until the abutment 53, on said rod engages the extremity of said latch and actuates the latter to free the crank 41, consequently permitting the spring 43, to turn the plate 35, and disconnect the gears 33 and 39. Obviously, when the crank 41, is freed and permitted to assume its normal position, the rod 58, connected therewith is moved so as to rock the shaft 56, and cranks 55 and 57, and raise the hook 54, from engagement with the ice. The ice engaging hook 54, is normally held in raised position by the supporting hook 60, and released by the latter when the hand lever 42, is actuated through a shaft 61, having cranks at its forward and rear ends and engaging respectively the hand lever 42, and the upper end of said supporting hook 60.

A pair of guides 62, is secured to each corner of the rear end of the supporting structure of the machine, extend vertically, and are connected at their upper ends by cross beams 63. A frame consisting of a pair of spaced beams 64, is mounted between the guides 62, and connected with the cranks 65 and 66, by the connecting rods 67. The rear ends of the cranks 65 and 66, are provided with additional cranks 68, which latter are connected by the connecting rod 69, whereby the opposite ends of the frame 64, are moved simultaneously and in the same direction. A lever 70, is secured to a part of the supporting structure and is connected by a link 71, to the upturned end of a shaft operated by a hand lever 72, having a suitable locking device 73 thereon. The upper end of the lever 70, is connected to an arm 73ª, of the crank 65, by a link 74. By proper manipulation of the hand lever 72, the frame 64, may be raised or lowered as desired, and secured in its adjusted position by the locking device 73.

A bearing block 75, is slidably mounted between and guided by the beams 64, of the vertically adjustable frame, and rotatably receives a shaft 76, to the rear end of which is secured a circular saw 77. The saw 77, is adapted to cut across or transversely of the line of travel of the machine, as will be understood, and is suitably driven by a belt 78, working over a spring actuated idler 79, a pair of idlers 80, carried by the top beam 64, pulley 81, fixed to the shaft 76, and the pulley 82, fixed to the longitudinal extending shaft 28.

When the winding shaft 38, is stopped by the automatic disconnection of the gears 33 and 39, as hereinbefore described, the progress of the machine is stopped, and at this time the operator manipulates the lever 72, so as to lower the beams 64, and saw 77, upon the ice. The saw 77, and bearing block 75, are moved transversely of the machine during the cross cutting by a cable 83, wound around and fixed to a shaft 84, and having its ends secured to the respective ends of said bearing block 75, and working over a pulley 86, at the end of the top beam 64. The shaft 84, is adapted to be rotated first in one direction and then in the other for reciprocating the bearing block 75, and saw 77, longitudinally of the beams 64, by exerting pulling force on the ends of the cable 83 alternately by a suitable train of gears 87, mounted upon the extended end of the top beam 64. The last of the train of gears 87, is adapted to mesh with the gear wheel 88, carried by the shaft 28, when the saw supporting frame 64, is in its lowermost position for moving said saw longitudinally of the frame 64. Said 1st gear of the train 87, is adapted to mesh with the top gear wheel 89, driven from the shaft 28, by the belt 90, when the frame 64, is raised by the operator, and in this way the saw 77, and the bearing block 75, are moved to their initial position.

The operation of the machine as a whole omitting the descriptions of such portions as have already been described, may be briefly set forth as follows: The driver or operator of the machine takes his position upon the platform 8 at the forward end of the machine in such position as to have ready access to the clutch levers, the lever 72 and the foot pedal 47 and is also in proximity to the motor which although not shown is also carried on the forward platform 8. When it is desired to move the machine onward the operator's assistants drive the stakes 50 into the ice the desired distance ahead, the clutch for operating the shaft 14 is thrown in by the driver and the clutch 27 also moved to provide for the proper meshing of one of the gears 22 or 23 with the gear 24 which will result in a driving of the shaft 28 and a consequent rotation of the winding shaft 38 through the worm gears 30 and 31 and the spur gears 33 and 39 providing the latch 45 engages the crank 41 of the lever 42 against the tension of the spring 43 in order to accomplish the proper meshing of these two last named gears. As has been before stated the ice engaging hooks 54 are driven downwardly into the ice by movement of the crank 41 and determine as previously set forth the distance which the machine is adapted to travel by the winding upon the shaft 38, of the cables 49. After the machine has traveled this predetermined distance the latch 45 is automatically disengaged from the crank 41 allowing the spring 43 to return the gear 33 out of engagement with the gear 39 which naturally prevents further rotation of the winding shaft 38 and brings the machine to a rest, although the foot pedal 47 may be used by the operator to accomplish the stopping of the machine at any time it is desirable to do so without causing the machine to travel the full distance permitted it by the automatic means above described. While the machine is going forward the longitudinally cutting saws 17 are cutting the ice directly under the machine into strips the width of which is equal to the lateral distance between the saws while the reciprocating cross cut saw 77 mounted as described in its guide members and reciprocated by the motion of the cable 83 wound upon and fastened to the shaft 84 is used for cutting these strips transversely to form the usual blocks in which the ice is customarily handled. The sizes of these blocks as far as regards the length can be readily adjusted by the driver without moving from his position by operating the handle lever 72 controlling the operation of the cross cut saw 77. The various other operations and the coacting relationship existing between the remaining elements has already been previously set forth and from the description of this preferred embodiment of my invention as contained in the specification and illustrated in the drawings, I now claim the device disclosed as defined in the appended claims.

Having thus fully described my invention what I claim as new and desire to secure by Letters-Patent is;

1. In an ice cutting machine, a supporting structure, longitudinally positioned ice cutting saws rotatably mounted in said structure, operating means for driving said saws, a winding shaft positioned transversely of the forward end of said supporting structure, cables attached at one end to said winding shaft, ice engaging means carried at the other end of said cables, and means for intermittently connecting said winding shaft with said operating means whereby the former may be rotated to wind the cable thereupon.

2. In an ice cutting machine, a supporting structure, longitudinally positioned ice cutting saws rotatably mounted in said structure, operating means for driving said saws, a winding shaft positioned transversely of the forward end of said supporting structure, cables attached at one end to said winding shaft, ice engaging means carried at the other end of said cables, means for intermittently connecting said winding shaft with said operating means whereby the former may be rotated to wind the cable thereupon, and means for automatically disconnecting the driving connections between said operating means and said winding shaft when the machine has traveled a predetermined distance.

3. In an ice cutting machine, a supporting platform, longitudinally acting cutting saws rotatably mounted on said platform, operating means for driving said saws, a winding shaft carried forwardly of said platform, cables attached at one end to said shaft, ice gripping means carried by the other end of said cables, driving connections interposed between said operating means and said winding shaft, manually shiftable means for engaging or disengaging said driving connections with said operating means, and further manually operable means for operatively connecting said driving connections with said winding shaft whereby the latter is rotated and said cable wound thereon.

4. In an ice cutting machine, a supporting platform, longitudinally acting cutting saws rotatably mounted on said platform, operating means for driving said saws, a winding shaft carried forwardly of said platform, cables attached at one end to said shaft, ice gripping means carried by the other end of said cables, driving connections interposed between said operating means and said winding shaft, manually shiftable means for engaging or disengaging said driving connections with said operating means, further connecting means interposed between said driving connections and said winding shaft whereby the same may be intermittently connected, and manually operable means whereby said further connecting means may be operated to engage said driving connections with said winding shaft for winding said cables upon the latter.

5. In an ice cutting machine, a supporting platform, longitudinally acting cutting saws rotatably mounted on said platform, operating means for driving said saws, a winding shaft carried forwardly of said platform, cables attached at one end to said shaft, ice gripping means carried by the end of said cables, driving connections interposed between said operating means and said winding shaft, manually shiftable means for engaging or disengaging said driving connections with said operating means, further connecting means interposed between said driving connections and said winding shaft whereby the same may be intermittently connected, manually operable means whereby said further connecting means may be operated to engage said driving connections with said winding shaft for winding said cables upon the latter, and resilient means normally holding said further connecting means out of that position which operatively engages said driving connection with said winding shaft.

6. In an ice cutting machine, a supporting platform, longitudinally acting cutting saws rotatably mounted on said platform, operating means for driving said saws, a winding shaft carried forwardly of said platform, cables attached at one end to said shaft, ice gripping means carried by the end of said cables, driving connections interposed between said operating means and said winding shaft, manually shiftable means for engaging or disengaging said driving connections with said operating means, further connecting means interposed between said driving connections and said winding shaft whereby the same may be intermittently connected, manually operable means whereby said further connecting means may be operated to engage said driving connections with said winding shaft for winding said cables upon the latter, resilient means normally holding said further connecting means out of that position which operatively engages said driving connections with said winding shaft, and latching means automatically coacting with said manually operable means to hold said further connecting means in that position in which said driving connections and said winding shaft are operatively connected against the tension of said resilient means, when said manually operable means are properly moved to accomplish such engagement.

7. In an ice cutting machine, a supporting platform, longitudinally acting cutting saws rotatably mounted on said platform, operating means for driving said saws, a winding shaft carried forwardly of said platform, cables attached at one end to said shaft, ice gripping means carried by the end of said cables, driving connections interposed between said operating means and said winding shaft, manually shiftable means for engaging or disengaging said driving connections with said operating means, further connecting means interposed between said driving connections and said winding shaft whereby the same may be intermittently connected, manually operable means whereby said further connecting means may be operated to engage said driving connections with said winding shaft for winding said cables upon the latter, resilient means normally holding said further connecting means out of that position which operatively engages said driving connections with said winding shaft, latching means automatically coacting with said manually operable means to hold said further connecting means in that position in which said driving connections and said winding shaft are operatively connected against the tension of said resilient means, when said manually operable means are properly moved to accomplish such engagement, and automatic ice gripping means coacting with said latching means to displace the same after a predetermined time to allow said resilient means to disengage said driving connections with said winding shaft.

8. In an ice cutting machine including a supporting platform, longitudinally acting ice cutting saws rotatably mounted in said platform, operating means for driving said saws, a winding shaft positioned forwardly of said platform, cables secured at one end to said winding shaft, ice gripping means carried at the other ends of said cables, manually operable means for engaging said operating means for said winding shaft to wind said cables thereupon and pull the machine toward said ice gripping means, and further ice gripping means automatically engageable for causing a break in the connection between said operating means and said winding shaft and consequently a cessation of the movement of said machine after it has traveled a predetermined distance.

9. An ice cutting machine including a supporting platform, longitudinally acting ice cutting saws rotatably mounted thereon, driving means for said saws, means connectible to said driving means for drawing the machine forward, automatic means coacting with said connectible means for arresting the forward progress of the machine, a saw frame carried transversely of the machine, a transversely acting saw positioned in said frame, manually operable means for raising or lowering said frame and consequently engaging or disengaging said saw with the ice, driving means for said saw, and means automatically coacting with the saw frame at the extremities of its upward or downward movement for causing reciprocation of said transverse saw in said frame in opposite directions.

In testimony whereof I have signed my name to this specification in the presence of two subscribing witnesses.

HERMAN BLANK, Jr.

Witnesses:
HENRY H. STEINBEEK,
W. M. ISENHOWAR.

Copies of this patent may be obtained for five cents each, by addressing the "Commissioner of Patents, Washington, D. C."